(12) United States Patent
Wallin et al.

(10) Patent No.: US 6,953,554 B2
(45) Date of Patent: Oct. 11, 2005

(54) CATALYTIC DEVICES AND METHOD OF MAKING SAID DEVICES

(75) Inventors: Sten A. Wallin, Midland, MI (US); Christopher P. Christenson, Lake Jackson, TX (US); David H. West, Houston, TX (US); Martin C. Cornell, Lake Jackson, TX (US); Zoran R. Jovanovic, Midland, MI (US); Henri J. M. Gruenbauer, Oostburg (NL)

(73) Assignee: Dow Global Technologies Inc., Midland, MI (US)

( * ) Notice: Subject to any disclaimer, the term of this patent is extended or adjusted under 35 U.S.C. 154(b) by 802 days.

(21) Appl. No.: 09/745,590

(22) Filed: Dec. 21, 2000

(65) Prior Publication Data

US 2001/0038810 A1 Nov. 8, 2001

Related U.S. Application Data

(60) Provisional application No. 60/173,017, filed on Dec. 23, 1999.

(51) Int. Cl.[7] .................. B01D 50/00; B01D 53/34
(52) U.S. Cl. .................................. 422/177; 422/168
(58) Field of Search ......................... 422/177, 168, 422/180, 222; 55/523, DIG. 30

(56) References Cited

U.S. PATENT DOCUMENTS

| | | | | |
|---|---|---|---|---|
| 3,097,115 A | * | 7/1963 | Moos ........................... | 429/40 |
| 3,235,512 A | * | 2/1966 | Koepernik .................... | 502/63 |
| 3,397,154 A | * | 8/1968 | Talsma ......................... | 502/304 |
| 3,407,604 A | * | 10/1968 | Keith et al. ................... | 60/217 |
| 3,441,381 A | * | 4/1969 | Schreuders et al. .......... | 422/176 |
| 3,856,706 A | * | 12/1974 | Harrison et al. ............. | 502/439 |
| 4,293,357 A | | 10/1981 | Higuchi et al. ............... | 156/89 |
| 4,304,585 A | | 12/1981 | Oda et al. ..................... | 65/43 |
| 4,483,944 A | * | 11/1984 | Day et al. ..................... | 502/439 |

(Continued)

FOREIGN PATENT DOCUMENTS

| | | |
|---|---|---|
| DE | 34 37 641 A1 | 4/1985 |
| JP | 59-39782 | 3/1984 |
| JP | H3-141181 | 6/1991 |
| JP | H4-65372 | 3/1992 |
| JP | 4-78447 | 3/1992 |
| JP | 4-193782 | 7/1992 |
| JP | 5-58618 | 3/1993 |
| JP | H5-317727 | 12/1993 |

OTHER PUBLICATIONS

K. Yoshida, et al.; "Regeneration Performance of a Catalyzed Versus a Non–Catalyzed Ceramic Membrane Diesel Particulate Trap;" *FR CISTI ICIST*; Apr. 9, 2000; pp. 121–134.

G. Saracco, et al.; "Diesel particulate abatement via catalytic traps;" *Catalysis Today*; 60; pp. 33–41.

M. Zwinkels, et al.; "Preparation of combusion catalysts by washcoating alumina whiskers–covered metal monoliths using a sol–gel method;" *Preparation of Catalysts VI*; 1995; pp. 85–177.

M. Zwinkels, et al.; "Catalytic Fuel Combustion in Honeycomb Monolith Reactors;" pp. 149–177.

Primary Examiner—M. Alexandra Elve

(57) ABSTRACT

The invention is a catalytic device comprised of a catalyst support of fused ceramic grains and a catalyst that is surface-bound to at least a portion of the ceramic grains, incorporated into at least a portion of the ceramic grains or combinations thereof, wherein the grains and catalyst form a surface structure that has a box counting dimension of greater than 1.00 or the box counting dimension has at least one step change when measured from a box size "d" of at least about 1 micrometer to at most about 1 millimeter. The invention is particularly useful in making a catalytic converter or catalytic converter-soot trap.

37 Claims, 2 Drawing Sheets

U.S. PATENT DOCUMENTS

| | | |
|---|---|---|
| 4,515,758 A | 5/1985 | Domesle et al. .......... 423/213.2 |
| 4,559,193 A | 12/1985 | Ogawa et al. ................. 264/60 |
| 4,810,463 A * | 3/1989 | Schwarz et al. ............... 419/10 |
| 4,910,172 A | 3/1990 | Talmy et al. .................. 501/95 |
| 4,911,902 A | 3/1990 | Talmy et al. ................ 423/328 |
| 4,948,766 A | 8/1990 | Talmy et al. ................ 501/128 |
| 5,098,455 A | 3/1992 | Doty et al. .................... 55/523 |
| 5,173,349 A | 12/1992 | Yavuz et al. ................. 428/116 |
| 5,194,154 A * | 3/1993 | Moyer et al. ............ 210/510.1 |
| 5,198,007 A * | 3/1993 | Moyer et al. ................. 55/523 |
| 5,252,272 A | 10/1993 | Yavuz et al. ................... 264/62 |
| 5,340,516 A * | 8/1994 | Yavuz et al. ................. 264/630 |
| 5,427,601 A * | 6/1995 | Harada et al. ................. 75/235 |
| 5,569,455 A * | 10/1996 | Fukui et al. ................. 422/174 |
| 5,716,899 A * | 2/1998 | Guile et al. ................. 502/439 |
| 5,783,515 A | 7/1998 | Sakurai et al. .............. 502/207 |
| 5,972,829 A * | 10/1999 | Ichimura .................... 502/303 |
| 5,981,415 A * | 11/1999 | Waku et al. ................. 501/80 |
| 2002/0128151 A1 * | 9/2002 | Galligan et al. ............ 502/302 |

* cited by examiner

CATALYTIC DEVICES AND METHOD OF MAKING SAID DEVICES

CROSS-REFERENCE TO RELATED APPLICATION

This application claims the benefit of U.S. Provisional Application Ser. No. 60/173,017, filed Dec. 23, 1999.

FIELD OF THE INVENTION

The invention relates to catalytic converters for automotive and diesel applications.

BACKGROUND OF THE INVENTION

Catalytic converters were first used in the early 1970s to reduce harmful exhaust emissions, such as carbon monoxide, hydrocarbons and nitrous oxides ($NO_x$) produced by automobiles. These converters are still employed and are typically made by forming a honeycomb support structure comprised of metal or ceramic (e.g., cordierite) covered by a coating containing a precious metal catalyst. The catalyst-coated structure is placed in a metal container connected to the exhaust system, such that the exhaust gas flows through the channels of the honeycomb.

The catalyst coating is typically applied using a wash coat consisting of nanometer size particles of precious metal (e.g., platinum, palladium and rhodium) deposited on micrometer size agglomerated particles of alumina. The coating thickness is typically about 10 to 100 micrometers thick covering the entire surface of the metal or cordierite, including any surface roughness. The catalyst coating is made this thick to provide sufficient catalyst loading within the volumetric limitations of the converter device to ensure adequate initial performance and an adequate performance life of the catalytic converter.

Even though these catalytic converters are effective in reducing emissions once they reach operating temperatures, they are not very effective at reducing emissions upon "cold start." Cold start is when the catalyst temperature is low (e.g., ambient) and the rate of catalytic reaction is too slow for effective treatment of exhaust gas. As the hot engine gases heat the catalyst, a temperature where the catalysts start to operate (generally referred to as light-off) is reached and reactions occur causing, for example, the oxidation of CO to $CO_2$. As a result, it is well recognized that automobiles are the most polluting during the first minutes after they are started.

Considering the amount of automobiles and ever more stringent clean air standards, this initial start-up pollution has become more of a problem. To solve this problem, several approaches have been tried, such as the preheating of the catalytic converter using resistance heating powered by the auto's battery. This approach suffers from excessive wear on the battery, added complexity and inability to start the vehicle and go immediately (i.e., it takes a couple of minutes for the converter to warm up). Another approach has been the capture of heat of the engine, which can be used sometime later to heat the converter. This approach also suffers from added complexity, the inability to start and go immediately and limited time where the heat may be retained (e.g., 24 hours or less).

Accordingly, it would be desirable to provide a catalytic device and method of forming said device that overcomes one or more of the problems of the prior art, such as one of those described above.

SUMMARY OF THE INVENTION

A first aspect of the invention is a catalytic device comprised of a catalyst support of fused ceramic grains and a catalyst that is surface bound to at least a portion of the ceramic grains, incorporated into at least a portion of the ceramic grains or combinations thereof, wherein the grains and catalyst form a surface structure that has a box counting dimension of greater than 1.00 or the box counting dimension has at least one step change, when measured from a box size "d" of at least about 1 micrometer to at most about 1 millimeter.

A second aspect of the invention is a catalytic converter comprised of the catalytic device of the first aspect enclosed within a metal container that has an inlet and outlet for flowing a gas over the catalytic device.

A third aspect of the invention is a catalytic converter comprised of the catalytic device of the first aspect enclosed within a metal container that has an inlet and outlet for flowing gas through the catalytic device.

A fourth aspect of the invention is a catalytic converter-soot trap comprised of the catalytic device of the first aspect enclosed within a metal container having an inlet and outlet for flowing a gas through the catalytic device.

Surprisingly, the catalytic device of the first aspect may allow the use of a much thinner catalyst coating and faster lightoff than the typical automobile catalytic converter. In addition, the catalytic device may also be used as a filter element for entrapping soot particles that are subsequently burned off by the heat generated by the catalytic exothermic reactions of the catalytic device (e.g., $CO+\frac{1}{2}O_2=CO_2$).

In addition, the catalytic device may be used for any reaction that may be auto-thermal. That is to say, a reaction that has an ignition point and extinction point. Generally, this is when a reaction has a Zeldovich number "B" that has an absolute value of at least about 4. The Zeldovich number "B" is given by:

$$B = \frac{-\Delta H C_o}{C_p \rho} \frac{E}{RT_o^2}$$

where $\Delta H$ is the heat of reaction, $C_o$ is the concentration of limiting reactant, $\rho$ is the density of the fluid, $C_p$ is the heat capacity of the fluid, E is the overall activation energy of the reaction, $T_o$ is the reactant temperature and R is the universal gas constant.

DETAILED DESCRIPTION OF THE INVENTION

Figure 1A:
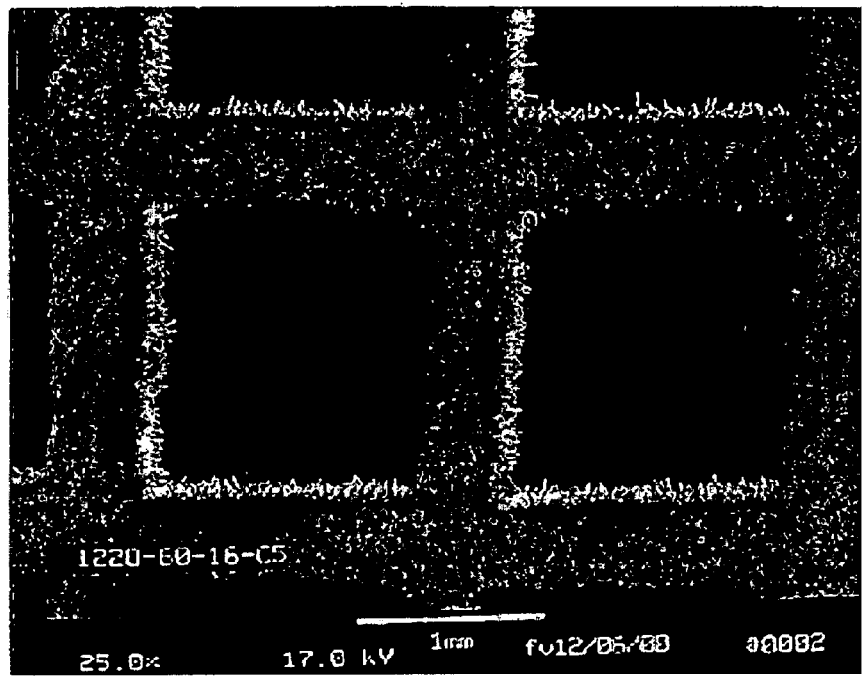
FIG. 1 consists of scanning electron micrographs at 25× (1a) and 100× (1b) of an example of the present invention's catalytic device, wherein the catalyst is a wash coat of alumina and platinum deposited in the walls and on the needles of an acicular mullite honeycomb substrate.

The invention is a catalytic device comprised of a catalyst support of fused ceramic grains and a catalyst that is surface bound to at least a portion of the ceramic grains, incorporated into at least a portion of the ceramic grains or combinations thereof, wherein the grains and catalyst form a surface structure that has a box counting dimension of greater than 1.00 or at least one step change, when measured from a box size "d" of at least about 1 micrometer to at most about 1 millimeter.

In the invention, it is believed, the ceramic grains and catalyst increase the area on the surface where gases may catalytically react under more favorable diffusion conditions. For example, it is believed the grains and catalyst may lessen the diffusion resistance caused by the small pore channels between wash coat particles. Commonly, these wash coats have pore channel openings on the order of less than about 1 micrometer. Illustrative of the surface structure of this invention is one in which a flat surface has orthogonal cylindrical protrusions extending outward from the surface, i.e., a "bed of nails," so long as the distance between the protrusions (i.e., nails) did not became so small that the channels created between them had an opening so small that diffusion of gases in the channels would be substantially impeded. Another example of a surface structure is randomly oriented asymmetric grains that form a porous surface structure.

The box counting dimension of the surface structure is greater than 1.00 when the structure is a fractal type of structure. Alternatively, when the surface structure is periodic (e.g., "bed of nails"), the box counting dimension has at least a one step change in slope of the line described below. The box counting method may be determined by those known in the fractal art, such as those described by Falconer, *Fractal Geometry Mathematical Foundations and Applications*, John Wiley and Sons, NY, pages 38–47, 1990.

The following is an example of one of the box counting methods that may be used. First, circles or boxes of dimension "d" are used to cover the same portion of the surface structure from a micrograph of the cross-section of the surface as shown in the Figures (e.g., the micrograph of a "bed of nails" would look like a comb viewed orthogonal to the length of the teeth of the comb). The smallest dimension of "d" is the lower limit (about 1 micrometer) and the largest dimension "d" is the upper limit (about 1 millimeter), described in the previous paragraph. The amount of boxes or circles "M" needed to cover the surface is determined periodically at and between the upper and lower limits. The box dimension is given by the logarithmic rate of the log of "M" versus the log of "d" as "d" approaches zero within the confines of the measurement limits. In analyzing the surface by the box counting method, commercially available image analysis software may be used such as "Benoit," version 1.3, Fractal Analysis System, available from TruSoft International, Inc., St. Petersburg, Fla. 33704.

The box counting dimension is greater than 1 when the slope of the resulting line has an essentially constant slope (e.g., fractal-type surface). The box counting dimension has a step change when, within the upper and lower limits, a sudden change in slope of the line occurs and then the slope continues at a similar slope prior to the sudden change in slope. An example of a step change is when the box size just becomes equal to the space between the nails in the "bed of nails." These type of structures are referred to broadly as periodic structures and include quasi periodic structures (e.g., "bed of nails" having different length nails).

When a fractal-type structure is desired, the box counting dimension is preferably at least about 1.01, more preferably at least about 1.05, even more preferably at least about 1.2 and most preferably at least about 1.5. When the desired structure is periodic, it is preferred to have at least about 2 step changes, more preferably at least 3 step changes and most preferably at least 4 step changes.

The box counting dimension is determined at a lower limit of about 1 micrometer and an upper limit of about 1 millimeter. It is understood that the lower limit corresponds to the pore channel size between wash coat particles. Wash coat particles generally are comprised of agglomerated particles, which define smaller pore channels than those between the wash coat particles. It is also understood that cracks in a wash coat, for example, due to microscopy sample preparation are not applicable to the measurement. Preferably, the lower limit is about 2 micrometers, more preferably about 5 micrometers, and most preferably about 10 micrometers.

The ceramic grains may be any suitable ceramic grains, such as those known in the art. Generally, the ceramic grains are oxides. Preferably, the ceramic is an alumina, silica or an aluminosilicate. More preferably, the ceramic is the aluminosilicate. Most preferably, the ceramic grains are mullite grains. The type of grains may be determined by any suitable technique or techniques, such as electron diffraction, X-ray diffraction and energy dispersive spectroscopy.

Preferably, substantially all of the ceramic grains are acicular ceramic grains. Substantially all of the ceramic grains are acicular means that at least about 90 percent of the grains of the support are acicular grains. More preferably, all of the grains are acicular grains.

Acicular ceramic grains are ceramic grains that, generally, have an aspect ratio of at least about 2. Preferably, the acicular grains have an aspect ratio of at least about 10. In general, the cross-sectional dimension (i.e., width and depth) are at least about 0.1 micrometer to about 250 micrometers. Preferably the cross-sectional dimension is at least about 1 micrometer, more preferably at least about 2 micrometers and most preferably at least about 10 micrometers to preferably at most about 150 micrometers, more preferably at most about 100 micrometers and most preferably at most about 50 micrometers. The length of acicular grains (i.e., the longest dimension) is, generally, at least about 1 micrometer to at most about 2 millimeters. Preferably, the length is at least about 10 micrometers, more preferably at least about 20 micrometers and most preferably at least about 100 micrometers, to preferably at most about 1.5 millimeters, more preferably at most about 1 mm, and most preferably at most about 500 micrometers.

The ceramic grains are also fused with each other to form the catalyst support. "Fused" means that the grains have been sintered together (i.e., the grain boundary between grains is comprised of a ceramic including, for example, a glass).

The catalyst support is preferably porous (i.e., a porous catalyst support). It is also preferred that substantially all of the porosity is open porosity. Open porosity is porosity that is accessible to a liquid or gas (i.e., can be penetrated by a liquid or gas). In other words, the open porosity is not closed or entrapped. Preferably, this open porosity is continually interconnected throughout the support, which generally occurs when the acicular grains are randomly oriented. "Substantially all," in this context, means that the catalyst support contains at most about 5 percent closed porosity out of the total amount of porosity of the catalyst support. Preferably, the amount of closed porosity is at most about a trace amount. Preferably, most of the closed porosity is comprised of pores within individual grains (i.e., not pores defined by the surfaces of more than one grain). The open and closed porosity may be measured by a suitable technique, such as those known in the art.

Because of the unique structure of the preferred acicular ceramic grains, the porous catalyst support may have a strength suitable for catalytic converter applications, while having a porosity of at least about 40 percent by volume.

Preferably, the porosity is at least about 50 percent, more preferably at least about 60 percent and most preferably at least about 65 percent, to, generally, at most about 85 percent by volume of the catalyst support.

The catalytic device, in addition to the catalyst support, is comprised of a catalyst that is surface-bound to at least a portion of the ceramic grains, incorporated into at least a portion of the ceramic grains or combinations thereof. The catalyst may be any suitable catalyst, such as those known in the art. In particular, the catalyst may be any one of the following preferred embodiments or combinations of them.

A first preferred catalyst is directly bound-metal catalysts, such as noble metals, base metals and combinations thereof. Examples of noble metal catalysts include platinum, rhodium, palladium, ruthenium, rhenium, silver and alloys thereof. Examples of base metal catalysts include copper, chromium, iron, cobalt, nickel, zinc, manganese, vanadium, titanium, scandium and combinations thereof. The metal catalyst, preferably, is in the form of a metal, but may be present as an inorganic compound, such as an oxide, nitride and carbide, or as a defect structure within the ceramic grains of the porous catalyst support. The metal may be applied by any suitable technique, such as those known in the art. For example, the metal catalyst may be applied by chemical vapor deposition.

A second preferred catalyst coating is one that is incorporated into the lattice structure of the ceramic grains of the porous catalyst support. For example, an element may be Ce, Zr, La, Mg, Ca, a metal element described in the previous paragraph or combinations thereof. These elements may be incorporated in any suitable manner, such as those known in the art and by methods described later.

A third preferred catalyst is a combination of ceramic particles having metal deposited thereon. These are typically referred to as wash coats. Generally, wash coats consist of micrometer sized ceramic particles, such as zeolite, aluminosilicate, silica, ceria, zirconia, barium oxide, barium carbonate and alumina particles that have metal deposited thereon. The metal may be any previously described for directly deposited metal. A particularly preferred wash coat catalyst coating is one comprised of alumina particles having a noble metal thereon. It is understood that the wash coat may be comprised of more than one metal oxide, such as alumina having oxides of at least one of zirconium, barium, lanthanum, magnesium and cerium.

A fourth preferred catalyst is a perovskite-type catalyst comprising a metal oxide composition, such as those described by Golden in U.S. Pat. No. 5,939,354.

A fifth preferred catalyst is one that is formed by and deposited on the catalyst support by calcining at a temperature of from about 300° C. to about 3000° C., a composition that comprises (a) an aqueous salt solution containing at least one metal salt and (b) an amphiphilic ethylene oxide containing copolymer, wherein the copolymer has an average molecular weight of greater than 400, an ethylene oxide content of 5 to 90 percent and an HLB of between −15 and 15, as described by Gruenbauer, et al., PCT patent application Ser. No. 99/18809. In addition, the catalyst may also be one such as described by U.S. Pat. No. 5,698,483 and PCT patent application Ser. No. 99/03627.

The catalyst is bound or incorporated into at least a portion of the ceramic grains when there is enough catalyst for the particular application. Generally, at least about 10 percent to essentially all of the ceramic grains are coated or contain a catalyst.

The catalyst is bound when it is chemically bonded to at least one element of the ceramic grains of the porous catalyst support.

Generally, the catalyst that is bound to the surface of the grains forms a layer, such that at least about 10 percent of the grains bound by the catalyst has a thickness of at most about ½ the thickness of the smallest dimension of each grain coated. Preferably, the thickness is at most about ⅓, more preferably at most about ¼ and most preferably at most about ⅕, as described in the previous sentence. In addition, it may also be desirable for the catalyst coating to be at most a monolayer (i.e., one atom or one molecule thick).

Ceramic grains that form a porous catalyst support may also be attached to a structural support that is comprised of a material having a porosity less than the porosity of the porous catalyst support. Generally, the structural support has a porosity that is at least about 20 percent less porous than the porous catalyst support. For example, when the porous catalyst support has a porosity of about 70 percent, the structural support would generally have a porosity of at most about 50 percent by volume. Generally, the structural support has a porosity of at most about 50 percent, more preferably at most about 30 percent and most preferably at most about 10 percent by volume.

The structural support may be attached by any suitable method. Generally, the structural support is attached sufficiently to withstand the rigors of the catalytic converter operation. Preferably, the structural support is fused to the porous catalyst support; fused being used in the same way as previously described.

The structural support may be any suitable material. For example, the material may be the same chemistry as the porous catalyst support or different chemistry, so long as the porosity is different as described previously. The structural support may be a metal, ceramic or combination thereof. When the structural support is a ceramic, it is preferred that the grains are substantially symmetrical as opposed to acicular. Substantially symmetrical is when the grains have an average aspect ratio of at most about 2. Cordierite is a preferred structural support.

The ceramic grains that form the catalyst support may be made by any suitable method. Suitable methods include, for example, methods for making acicular mullite, such as those described by U.S. Pat. Nos. 5,194,154; 5,198,007; 5,173,349; 4,911,902; 5,252,272; 4,948,766 and 4,910,172, each incorporated herein by reference.

In making the porous catalyst support, precursor compounds are generally mixed and then heated sufficiently to form the acicular ceramic grains of the support. For example, when the support is mullite, precursor compounds containing Al, Si and oxygen are generally mixed to form a mixture capable of forming fluorotopaz and, subsequently, mullite. Precursor compounds that may be used to form a mullite porous catalyst support are described in the aforementioned U.S. patents.

The mixture of precursor compounds may also contain precursor catalyst compounds that have elements that may be incorporated in the grain structure of the porous catalyst's acicular ceramic grains. Examples of compounds useful for forming these incorporated catalysts include inorganic and organic compounds that have elements described previously for catalysts that may be incorporated in the ceramic grains of the porous catalyst.

Other organic compounds may also be used to facilitate the shaping of the mixture (e.g., binders and dispersants, such as those described in *Introduction to the Principles of Ceramic Processing*, J. Reed, Wiley Interscience, 1988). Generally, the mixture, when forming a mullite porous catalyst support, is comprised of compounds, such as clay (i.e., hydrated aluminum silicate), other aluminosilicates, such as kyanite or zeolites, alumina, silica, aluminum trifluoride and fluorotopaz. Preferably, the precursor compounds are selected from the group consisting of clay, silica, alumina and mixtures thereof. Most preferably, the mixture is comprised of clay and alumina when forming a mullite porous catalyst support.

The mixture may be made by any suitable method, such as those known in the art. Examples include ball milling ribbon blending, vertical screw mixing, V-blending and attrition milling. The mixture may be prepared dry (i.e., in the absence of a liquid medium) or wet.

The mixture is then shaped into a porous shape by any suitable method, such as those known in the art. Examples include injection molding, extrusion, isostatic pressing, slip casting, roll compaction and tape casting. Each of these is described in more detail in *Introduction to the Principles of Ceramic Processing*, J. Reed, Chapters 20 and 21, Wiley Interscience, 1988, incorporated herein by reference.

The mixture of precursor compounds is heated under an atmosphere sufficient to form the porous catalyst support. Any suitable temperature and atmosphere may be used depending on the chemistry of the ceramic grains of the porous catalyst desired. For example, when forming mullite, at least during some portion of the heating of the precursor compounds, fluorine is present in the atmosphere from sources, such as $SiF_4$, $AlF_3$, HF, $Na_2SiF_6$, NaF, and $NH_4F$. Preferably, the source of fluorine in the atmosphere is from $SiF_4$.

The porous body, when making mullite, is generally heated to a first temperature for a time sufficient to convert the precursor compounds in the porous body to fluorotopaz and then raised to a second temperature sufficient to form the mullite composition. The temperature may also be cycled between the first and second temperature to ensure complete mullite formation. After mullite formation, the porous body may be treated to reduce the amount of fluoride ions in the article. Methods for reducing the fluoride ions include those described by U.S. Pat. No. 5,173,349. The first temperature may be from about 500° C. to about 950° C. Preferably the first temperature is at least about 550° C., more preferably at least about 650° C. and most preferably at least about 725° C. to preferably at most about 850° C., more preferably at most about 800° C. and most preferably at most about 775° C.

The second temperature generally is at least about 1000° C. to at most about 1700° C. Preferably the second temperature is at least about 1050° C., more preferably at least about 1075° C. and most preferably at least about 1100° C. to preferably at most about 1600° C., more preferably at most about 1400° C. and most preferably at most about 1200° C.

Generally, during the heating to the first temperature to form a mullite porous catalyst support, the atmosphere is inert (e.g., nitrogen) or a vacuum until about 500° C., which is when the fluorine-containing gas is typically introduced. During heating to the first temperature, organic compounds and water may be removed. These may also be removed in a separate heating step common in the art, such as described in *Introduction to the Principles of Ceramic Processing*, J. Reed, Wiley Interscience, 1988.

In addition to the catalyst being incorporated into the grains of the porous catalyst support, as described above, the catalyst may be applied after the support has been made by a suitable method, such as those known in the art. For example, the catalyst may be applied by a vapor deposition method and solution methods. In particular, a metal catalyst may be applied to the catalyst support from solution via a soluble salt (e.g., platinum salts) in a suitable solvent (e.g., water) followed by heating to decompose the salt. The catalyst may also be applied to the porous catalyst support by using known wash coats and methods of applying them. Of course, any one or combination of methods of forming the catalyst coatings may be used.

The catalytic device is also particularly useful when used in a catalytic converter. In one embodiment, the catalytic device is enclosed within a metal container that has an inlet and outlet for flowing a gas (e.g., exhaust gas) over the catalytic device, such as typically done in automobile exhaust systems. In another embodiment, the catalytic device is enclosed within a metal container that has an inlet and outlet for flowing gas through the catalytic device. The metal container may be any suitable container, such as those known in the art for making catalytic converters. The shape of the catalytic device may be any suitable shape, such as pellets, flat disks and honeycombs.

Surprisingly, under the same conditions, the catalytic converter comprised of the catalytic device generally has a shorter light-off time than known catalytic converters. Light-off time is the time required for the catalyst to reach the ignition temperature of the reaction. In addition, the amount of noble metal catalyst, if used, may be less because the particles or clusters of metal catalyst atoms may be more uniformly spread apart, avoiding the most problematic poisoning of catalytic converters, "sintering of the metal catalysts together." Preferably, the catalytic converter or device has a substantially shorter light-off time. Substantially, shorter light-off time generally means that the time is at least about 5 percent shorter.

Even more surprising, under the same conditions, the catalytic converter or device may have a lower light-off temperature than known catalytic converters made of metal or cordierite substrates prepared with substantially the same catalyst and tested under substantially the same conditions. Substantially the same catalyst and conditions include, for example, the same platinum loading and wash coat and gas flow rate and gas composition. Preferably, the light-off temperature is substantially lower. The light-off temperature is generally substantially lower when the temperature is at least about 10° C. lower. Preferably, the light-off temperature is at least about 15° C. and more preferably at least about 20° C. lower.

The catalytic device is also particularly useful as a particulate (soot) trap and exhaust catalyst for diesel engines. In this embodiment, the catalytic device is contained within a metal can having an inlet and outlet for passing the exhaust gas through the catalytic device. In such an arrangement, the soot particles generally would be trapped on a region having a porosity of smaller size and the exhaust gas would typically be catalyzed in a region having a porosity of larger size. Since the soot particles are retained at the catalyst, surprisingly, the soot particles may be combusted as the catalyst heats up to operating temperature and the resultant combustion gases catalyzed just as the exhaust gases are.

EXAMPLES

In general, the examples described below were tested under operating conditions that could be expected in a vehicle (e.g., about 0.5 percent by volume CO with excess oxygen and the amount of platinum generally used in such application). However, these examples are illustrative and in no way limit the scope of the invention as claimed.

Example 1

Square channel honeycombs having a cell density of about 240 cells per square inch and a wall thickness of about 0.013 to 0.014 inch were formed by extruding a mixture of natural ball clay (Todd Dark grade, Kentucky-Tennessee Clay Company), κ-alumina (ALCOA gibbsite calcined at 1100° C.) and polymer binders. The clay and alumina were mixed in proportions to give an Al:Si atom ratio of 3.15. A honeycomb was extruded. The extruded honeycomb was then slowly heated in air up to 1000° C. for one hour in order to burn off the polymeric binder and drive off the clay's structural water. The resulting calcined honeycomb was cut to the size required for testing and then converted to acicular mullite in a vacuum furnace attached to a $SiF_4$ source and equipped to allow control of the gas atmosphere.

The calcined honeycomb was heated under vacuum to 735° C. and held at that temperature for at least one hour, then cooled under vacuum to about 720° C. At this point, $SiF_4$ gas was added to maintain a pressure of 600 torr. The furnace was then heated at about 1.5° C. per minute, adding $SiF_4$ as necessary, to maintain a pressure of 600 torr, until the absorption of $SiF_4$ was essentially complete (about 820° C.). At this point, the reactor pressure was reduced to 200 torr and the reactor set to remove $SiF_4$, as necessary, to maintain that pressure. The furnace was heated at about 3° C. per minute to about 1000° C., then 1° C. per minute until evolution of $SiF_4$ substantially ceased (about 1100° C.). The reactor was evacuated and cooled to ambient temperature and the resultant mullite honeycomb having a cell density of about 238 cells per square inch was removed.

The mullite honeycomb was completely immersed into an aqueous alumina slurry (20 percent by weight), having a particle size of 120 nm and a surface area, after firing of 155 $m^2$ per gram available under the tradename DISPAL (Condea Chemie GMBH, Lake Charles, La.). The mullite honeycomb was pulled from the slurry and the excess slurry removed by blowing compressed air through the channels of the honeycomb. The sample was dried and immersed again in the slurry until enough alumina was added to give about 30,000 $m^2$ of surface area per liter of honeycomb volume after firing. When the desired amount of alumina was deposited, the mullite honeycomb was heated in an oven to a temperature of 600° C. for two hours.

After cooling to ambient temperature, the end of the honeycomb was dipped into a dilute ammonia solution of diaminedinitritoplatinum (0.425 percent by weight of diaminedinitritoplatinum), until the solution wicked halfway up the honeycomb, the honeycomb was then inverted and the procedure repeated. After drying under ambient conditions, the sample was heated in an air oven to 200° C. for two hours to decompose the diaminedinitritoplatinum to platinum oxide. The sample was then heated for six hours at 225° C. in a 5 percent hydrogen/nitrogen atmosphere to reduce the platinum oxide to platinum metal. The resultant catalytic device had a platinum concentration of 0.84 gram per liter, as calculated from the mass of platinum determined by neutron activation analysis and the outer dimensions of the catalytic device or monolith.

Figure 1B:

The light of temperature of the monolith was determined as follows. The monolith was fastened into a stainless steel sample holder by using INTERAM Mount Mat (3M Corporation). Calibrated mass-flow-controllers (Brooks) and an air/$N_2$/CO gas manifold were used to generate an $O_2$/$N_2$/CO gas mixture having a flow rate of about 40 standard liters per minute (slpm). The gas mixture was heated by a packed bed heat exchanger (stainless steel pipe filled with quartz chips and situated in a tube furnace) and then passed through the test monolith. The temperature of the gas entering the monolith ($T_3$) was measured by a type K thermocouple located in the sample holder ~1¾ inches upstream from the front face of the monolith. The set point temperature of the tube furnace was adjusted to limit $dT_3/dt$ to less than 5° C. per minute in the vicinity of the sample ignition. Composition of the gas mixture exiting the monolith and the sample holder was continuously monitored by CO/$O_2$/$CO_2$ analyzers (Servomex 1440 series) having the response time of less than 10 seconds. The light-off temperature was defined as the temperature ($T_3$) at which the CO concentration in the gas exiting the monolith dropped to 50 percent of its value in the inlet gas. Similarly, upon cooling the extinction temperature was defined as the inlet gas temperature at which exit CO concentration reaches 50 percent of the inlet value. This example had a light-off temperature of 246° C. and extinction temperature of 212° C., which are also shown in Table 1. In addition, this example is shown in FIG. 1, wherein the catalyst wash coat is deposited in the walls and on the needles of an acicular mullite honeycomb substrate.

Example 2

Example 2 was prepared and tested in the same way as Example 1, except that the platinum concentration was 1.56 grams per liter and the light-off temperature was 233° C. and extinction temperature of 200° C. (also shown in Table 1).

Example 3

Example 3 was prepared and tested in the same way as Example 1, except that the aqueous solution of diaminedinitritoplatinum concentration was 0.85 percent by weight thereof, the concentration of platinum was 2.03 grams per liter and the light-off temperature was 224° C. and extinction temperature of 185° C. (also shown in Table 1).

Example 4

Example 4 was prepared and tested in the same way as Example 3, except that the concentration of platinum was 2.73 grams per liter and the light-off temperature was 232° C. and extinction temperature of 192° C. (also shown in Table 1).

Comparative Example 1

A commercial cordierite (Grade EX-80) honeycomb, available from Corning Inc., Corning N.Y., having a cell density of 300 cells per square inch was coated with the same alumina and platinum and tested in the same way as the mullite of Example 3. The platinum concentration was 1.5 grams per liter and the monolith had a light-off temperature of 271° C. and extinction temperature of 229° C. (see Table 1).

Comparative Example 2

Figure 2A:
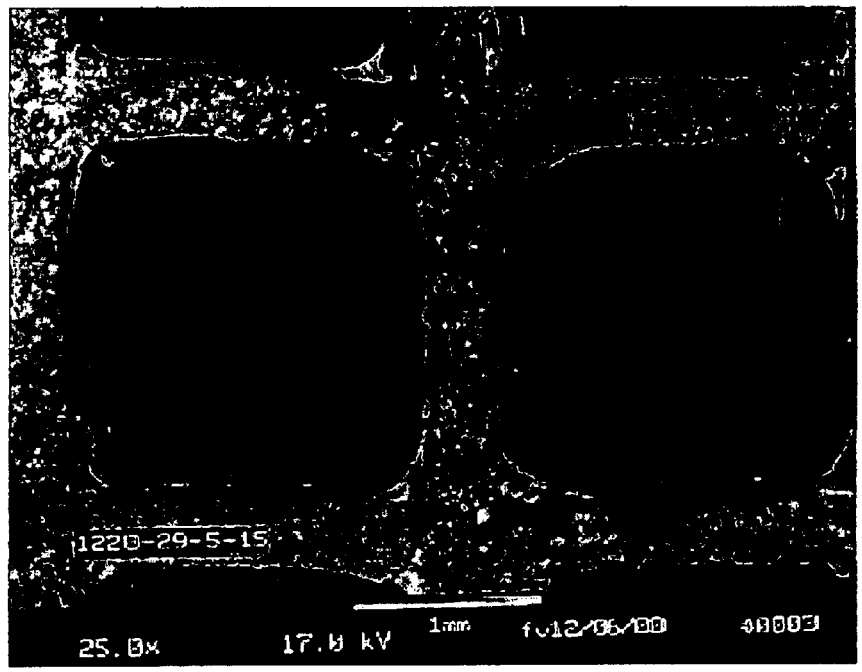
FIG. 2 consists of scanning electron micrographs at 25× (2a) and 100× (2b) of a catalytic device, not an embodiment of this invention, wherein the substrate is a commercially available cordierite honeycomb substrate that is covered by the same wash coat as in FIG. 1.
Figure 2B:
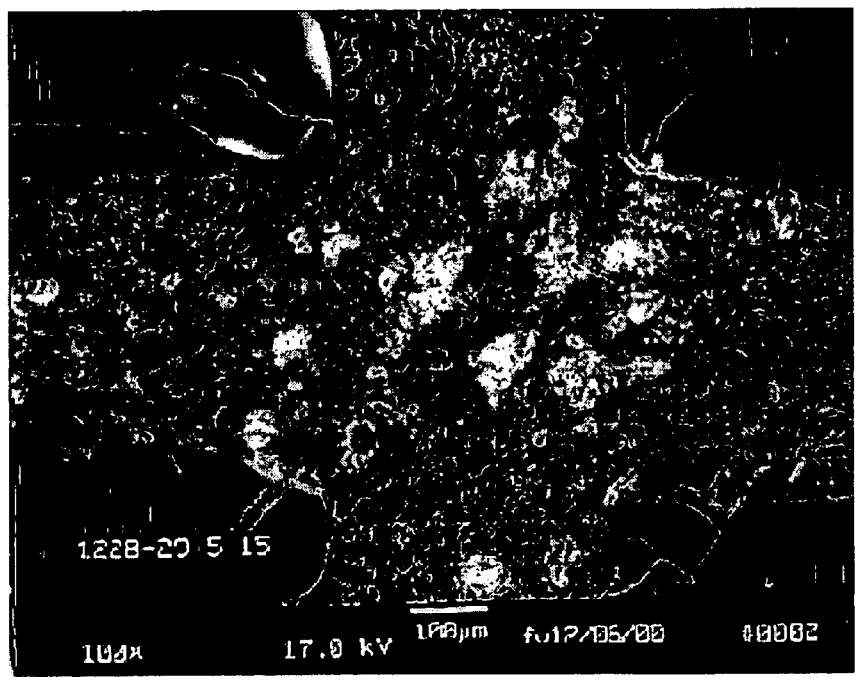

A commercial cordierite (Grade EX-80) honeycomb, available from Corning Inc., Corning N.Y., having a cell density of 200 cells per square inch was made and tested in the same way as Comparative Example 1, except that the concentration of the aqueous solution of diaminedinitritoplatinum was 1.7 percent by weight thereof. The platinum concentration was 1.8 grams per liter and the monolith had a light-off temperature of 262° C. and extinction temperature of 227° C. (see Table 1). In addition, this comparative example is shown in FIG. 2, wherein it is readily observable that the surface is not within the scope of claim 1.

Comparative Example 3

A commercial cordierite (Grade EX-80) honeycomb, available from Corning Inc., Corning N.Y., having a cell density of 300 cells per square inch was made and tested in the same way as Comparative Example 1, except that the concentration of the aqueous solution of diaminedinitritoplatinum was 1.7 percent by weight thereof. The platinum concentration was 3.0 grams per liter and the monolith had a light-off temperature of 240° C. and extinction temperature of 201° C. (see Table 1).

Comparative Example 4

A commercial cordierite (Grade EX-80) honeycomb, available from Corning Inc., Corning N.Y., having a cell density of 400 cells per square inch was made and tested in the same way as Comparative Example 1, except that the concentration of the aqueous solution of diaminedinitritoplatinum was 1.7 percent by weight thereof. The platinum concentration was 2.2 grams per liter and the monolith had a light-off temperature of 265° C. and extinction temperature of 223° C. (see Table 1).

TABLE 1

| Example Number | Cells Per In$^2$ of Sample (CPSI) | Platinum (g/l) | Light-Off Temperature (° C.) | Extinction Temperature (° C.) |
| --- | --- | --- | --- | --- |
| Example 1 | 238 | 0.84 | 246 | 212 |
| Example 2 | 238 | 1.56 | 233 | 200 |
| Example 3 | 238 | 2.03 | 224 | 185 |
| Example 4 | 238 | 2.73 | 232 | 192 |
| Comparative Example 1 | 300 | 1.52 | 271 | 229 |
| Comparative Example 2 | 200 | 1.79 | 262 | 227 |
| Comparative Example 3 | 300 | 3.05 | 240 | 201 |
| Comparative Example 4 | 400 | 2.19 | 265 | 223 |

Examples 1 through 4 show the general trend that the light-off temperature decreases with increasing platinum concentration as do Comparative Examples 1 and 3. It appears that a lower limit is reached with increasing platinum, which may be due, for example, to the platinum sintering together, effectively reducing the amount of platinum available for the reaction. In addition, the cells per square inch of the honeycomb appears to have little or no affect on the light-off temperature (see Comparative Examples 1, 2 and 4).

Surprisingly, even though using essentially the same wash coat alumina and platinum catalyst and the same amount of each, the invention's catalytic device has a light-off temperature almost 40° C. less than a commercial cordierite substrate (see Example 1 versus Comparative Examples 1 and 2). Even more surprising, the invention's catalytic devices, even at platinum concentrations half or less of that present on the cordierite-based catalytic devices, have a light-off temperature that is lower by about 30° C. (see Example 1 versus Comparative Examples 1, 2 and 4). It is only when the cordierite-based devices have about 4 times the concentration of platinum that the light-off temperature becomes comparable to the invention's catalytic devices.

This is entirely unexpected because it may allow, for example, the use of catalytic converters with substantially reduced noble metal concentrations, while still achieving the same performance. In addition, the lower light-off temperature at lower platinum concentrations may prevent, for example, catalyst degradation over time, due to sintering of the noble metals. Finally, the ability to light-off at a lower temperature at comparable noble metal concentrations may allow the meeting of more stringent emission regulations, without substantial cost or effort.

In addition, the extinction temperature is surprisingly lower in the same fashion as the light-off temperature. A lower extinction temperature is highly desirable because, once the catalyst is ignited, variation in engine speed, and exhaust composition and temperature, can cause extinction of the reaction. Consequently, a catalyst with lower extinction temperature is less susceptible to this problem. Thus, a catalyst with lower extinction temperature will produce higher conversion (efficiency), all other things being equal. It is also believed the lower extinction temperature should improve the life of the catalyst because the reaction will generally be closer to the inlet of the catalyst.

What is claimed is:

1. A catalytic device comprised of a catalyst support of fused ceramic grains and a catalyst that is surface-bound to at least a portion of the ceramic grains, incorporated into at least a portion of the ceramic grains or combinations thereof, wherein the grains and catalyst form a surface structure that has a box counting dimension of at least 1.2 or the box counting dimension has at least a one step change when measured from a box size "d" of at least about 1.0 micrometer to at most about 1 millimeter.

2. A catalytic device comprised of a catalyst support of fused ceramic grains and a catalyst that is surface-bound to at least a portion of the ceramic grains, incorporated into at least a portion of the ceramic grains or combinations thereof, wherein the grains and catalyst form a surface structure that has a box counting dimension of at least 1.2 or the box counting dimension has at least a one step change when measured from a box size "d" of at least about 1.0 micrometer to at most about 1 millimeter, wherein the ceramic grains have at least one catalytically active element incorporated therein.

3. The catalytic device of claim 1 wherein the ceramic grains are acicular mullite grains.

4. The catalytic device of claim 1 wherein the catalyst support is porous.

5. The catalytic device of claim 1 wherein the ceramic grains have an aspect ratio of at least about 10.

6. The catalytic device of claim 4 wherein the porous catalyst support has a porosity of at least about 50 percent by volume.

7. The catalytic device of claim 6 wherein the porosity is at least about 60 percent by volume.

8. The catalytic device of claim 7 wherein the porosity is at least about 70 percent by volume.

9. The catalytic device of claim 8 wherein the catalyst support is attached to a surface of a structural support that is comprised of a different material having a porosity less than the porosity of the catalyst support.

10. The catalytic device of claim 9 wherein the different material is a metal, a ceramic having grains that are substantially symmetrical or combination thereof.

11. The catalytic device of claim 10 wherein the structural support is the ceramic.

12. The catalytic device of claim 11 wherein the ceramic is cordierite.

13. The catalytic device of claim 12 wherein the catalyst support is mullite.

14. The catalytic device of claim 1 wherein the catalyst is a ceramic, metal or mixture thereof.

15. The catalytic device of claim 14 wherein the catalyst is comprised of an element selected from the group consisting of Ni, Ti, Fe, Ce, Zr, La, Mg, Ca and combinations thereof.

16. A catalytic device comprised of a catalyst support of fused ceramic grains and a catalyst that is surface-bound to at least a portion of the ceramic grains, incorporated into at least a portion of the ceramic grains or combinations thereof, wherein the grains and catalyst form a surface structure that has a box counting dimension of at least 1.2 or the box counting dimension has at least a one step change when measured from a box size "d" of at least about 1.0 micrometer to at most about 1 millimeter, wherein the catalyst is a zeolite having a metal thereon, alumina having a metal thereon or an aluminosilicate other than mullite having a metal thereon, perovskite-type catalyst or pyrochlors.

17. The catalytic device of claim 1 wherein the catalyst is directly bound to the ceramic grains of the catalyst support.

18. The catalytic device of claim 17 wherein the catalyst is a precious metal, base metal, base metal oxide or combinations thereof.

19. The catalytic device of claim 18 wherein the catalyst is selected from the group consisting of platinum, rhodium, palladium and combinations thereof.

20. The catalytic device of claim 18 wherein the base metal is selected from the group consisting of Cu, Cr, Fe, Co, Ni and combinations thereof.

21. The catalytic device of claim 1 wherein the catalyst is bound to at least a portion of the surface of the grains forming a layer, such that at least about 10 percent of the grains bound by the catalyst have a layer thickness of at most about ½ the thickness of the smallest dimension of each grain coated.

22. The catalytic device of claim 21 wherein at least about 10 percent of the grains bound by the catalyst have a layer thickness that is ¼ the thickness of the smallest dimension of each grain coated.

23. A catalytic converter comprised of the catalytic device of claim 1 that is enclosed within a metal container that has an inlet and outlet for flowing a gas over the catalytic device.

24. The catalytic converter of claim 23 wherein the converter reaches light-off in a shorter period of time than a catalytic converter using a conventional catalytic converter under the same conditions.

25. A catalytic converter comprised of the catalytic device of claim 4 that is enclosed within a metal container that has an inlet and outlet for flowing a gas through the catalytic device.

26. A catalytic converter-soot trap comprised of the catalytic device of claim 4 enclosed within a metal container having an inlet and outlet for flowing a gas through the catalytic device.

27. The catalytic converter of claim 23 wherein the converter has a light-off temperature that is lower than a conventional converter comprised of a cordierite or metal honeycomb substrate prepared with substantially the same catalyst and tested under substantially the same conditions.

28. The catalytic device of claim 16 wherein the device has a light-off temperature that is lower than a conventional device comprised of a cordierite or metal honeycomb substrate prepared with substantially the same catalyst and tested under substantially the same conditions.

29. The catalytic device of claim 28 wherein the catalyst is comprised of alumina having a metal thereon.

30. The catalytic converter of claim 23 wherein the converter has an extinction temperature that is lower than a conventional converter comprised of a cordierite or metal honeycomb substrate prepared with substantially the same catalyst and tested under substantially the same conditions.

31. The catalytic device of claim 16 wherein the device has an extinction temperature that is lower than a conventional device comprised of a cordierite or metal honeycomb substrate prepared with substantially the same catalyst and tested under substantially the same conditions.

32. The catalytic device of claim 1 wherein the grains and catalyst form a surface structure that has a box counting dimension of at least 1.2 measured from a box size "d" of at least 1 micrometer to a box size of at most 1 millimeter.

33. The catalytic device of claim 32 wherein the grains and catalyst form a surface structure that has a box counting dimension of at least 1.5 measured from a box size "d" of at least 1 micrometer to a box size of at most 1 millimeter.

34. The catalytic device of claim 1 wherein the grains and catalyst form a surface structure that has a box counting dimension having at least one step change when measured from a box size "d" of at least 1 micrometer to a box size of at most 1 millimeter.

35. The catalytic device of claim 34 wherein the grains and catalyst form a surface structure that has a box counting dimension having at least two step changes.

36. The catalytic device of claim 1 wherein the grains and catalyst form a surface structure that has a box counting dimension having at least 4 step changes.

37. The catalytic device of claim 1 wherein substantially all of the ceramic grains are acicular ceramic grains.

* * * * *